March 22, 1960    A. STEINER    2,929,468
BEVEL GEAR ASSEMBLY WITH IMPROVED LUBRICATION ASSEMBLY
Filed June 20, 1957    2 Sheets-Sheet 1

Inventor
Adolf Steiner
By J. C. Jones
Attorney

March 22, 1960 A. STEINER 2,929,468
BEVEL GEAR ASSEMBLY WITH IMPROVED LUBRICATION ASSEMBLY
Filed June 20, 1957 2 Sheets-Sheet 2
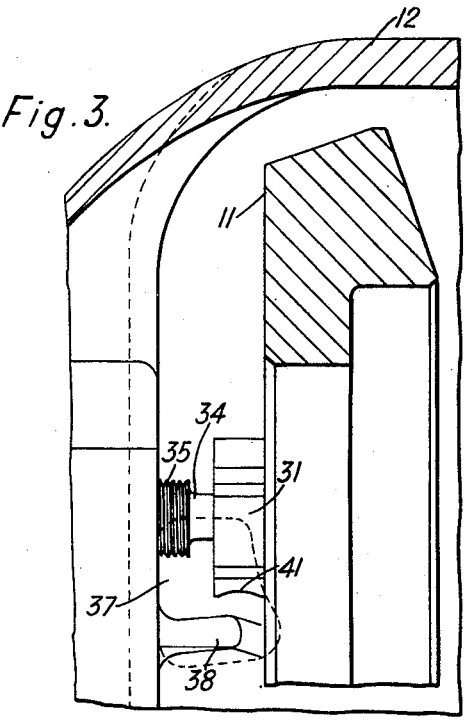
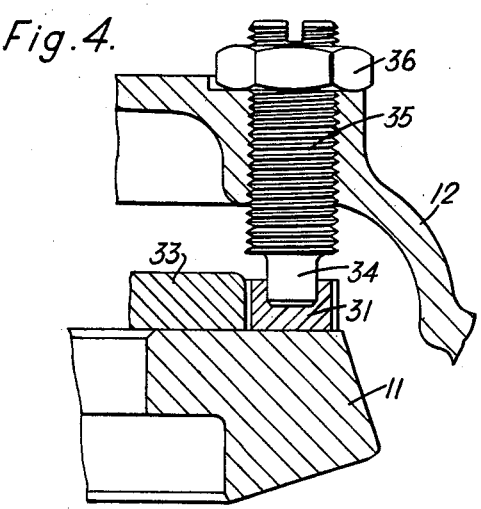
Inventor
Adolf Steiner
By
Attorney

United States Patent Office 2,929,468
Patented Mar. 22, 1960

2,929,468

BEVEL GEAR ASSEMBLY WITH IMPROVED LUBRICATION ASSEMBLY

Adolf Steiner, Ruesselsheim am Main, Hessen, Germany, assignor to General Motors Corporation, Detroit, Mich., a corporation of Delaware Application June 20, 1957, Serial No. 666,864

Claims priority, application Germany June 22, 1956

7 Claims. (Cl. 184—6)

This invention relates to bevel gear assemblies which comprise a bevel ring gear and pinion, and is particularly concerned with the lubrication of the pinion shaft bearing.

The bevel ring gear and pinion may constitute a worm, plain bevel, or skew bevel or hypoid gear set. The latter forms part of the differential gear of motor vehicles, and this invention is particularly applicable to it.

There is often difficulty in lubricating the pinion shaft bearing. The bevel ring gear is commonly housed in a casing which serves as a lubricant reservoir, and, as it rotates, lubricant is flung by it towards channels which communicate with the pinion shaft bearing. This is not always satisfactory, especially in motor vehicles, when the direction of rotation of the ring gear is such that the lubricant is moving upwardly as it is flung from the ring gear.

In a bevel gear assembly according to this invention lubricant is wiped off the bevel ring gear by a thrust pad for the bevel ring gear, and is then delivered through a channel to the pinion shaft bearing.

The pinion shaft bearing may advantageously be housed in an integral extension of a casing, which houses the bevel ring gear and forms a lubricant reservoir. The channel is then preferably a groove in the wall of the extension.

There is also, preferably, a return lubricant channel through which lubricant delivered to the pinion shaft bearing can return.

Figure 1:
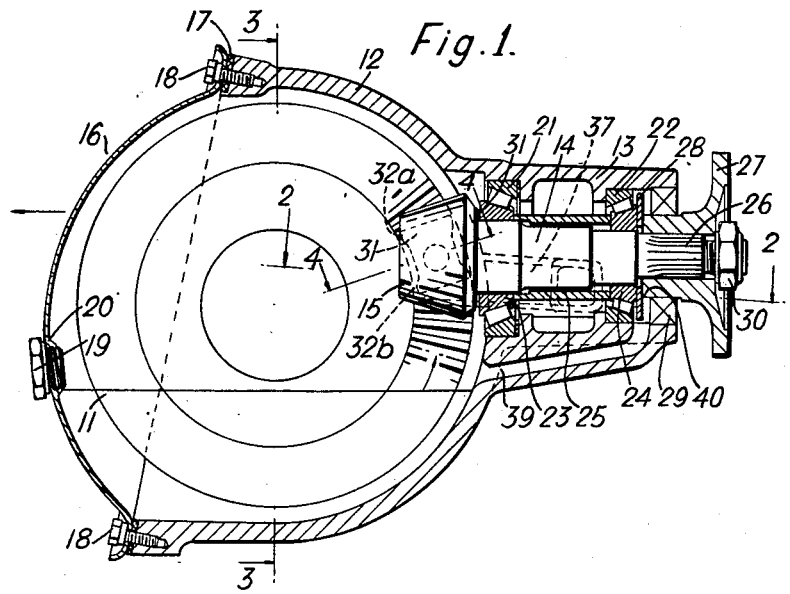
Figure 2:
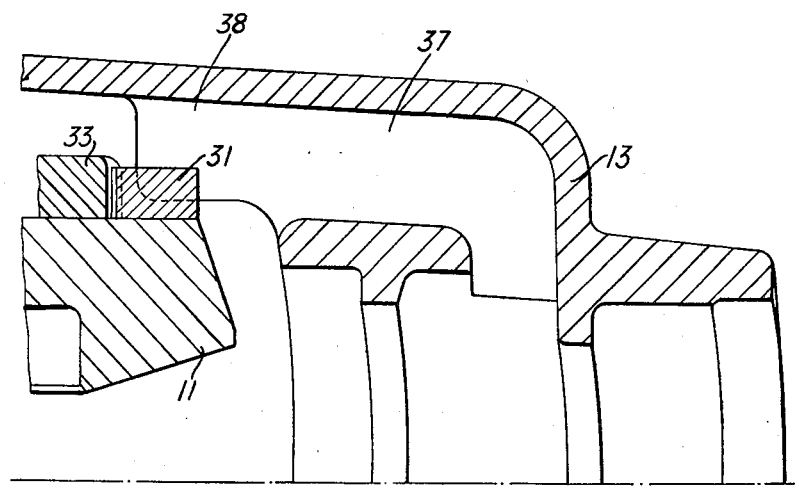

The scope of the invention is defined by the appended claims; and how it can be performed is hereinafter particularly described with reference to the accompanying drawings, in which:

Figure 1 is a longitudinal section through a differential gear which includes a bevel gear assembly according to the invention; and Figures 2, 3 and 4 are fragmentary sections on the lines 2—2, 3—3, and 4—4 respectively of Figure 1.

The drawings show part of a differential gear for a front wheel drive motor vehicle. The differential gear includes a hypoid gear set which comprises a bevel ring gear 11 connected through differential pinions and side gears (not shown) to steerable front wheels, and a drive pinion 15 whose shaft 14 is connected to the propeller shaft. The gear set is housed in a two-part casing; one part 12 of the casing is cast and has an integral extension 13 through which the pinion shaft 14 extends, and the other part is constituted by a sheet metal cover 16 which is secured to the part 12 by screws 18, a gasket 17 forming a lubricant seal. The cover 16 has a lubricant filler plug 20.

The pinion shaft 14 is supported in the extension 13 by two sets of tapered roller bearings 21 and 22 whose inner races 23 and 24 are spaced apart by a sleeve 25. The outer end of the shaft 14 is outwardly splined and is connected to the propeller shaft by means of an inwardly splined flange 27. A lubricant baffle disc 28 is fitted between the flange 27 and the inner race 24, and a lubricant seal 29 is fitted between circular surfaces of the flange 27 and the extension 13. A nut 30 which screws on to the end of the shaft 14 holds the flange 27, shaft 14, and bearings accurately located.

Under heavy operating loads deflection of the bevel ring gear 11 is prevented by a thrust pad 31, which, as shown in Figure 4, is mounted on the end 34 of a bolt 35 which is screwed into the casing 12 and prevented from rotating by a lock nut 36. The pad, which is rectangular, has edges 32a and 32b which abut against a hub 33 on the ring gear 11, and a concave lower surface 41 whose function is described below.

In order to lubricate the sets of rollers 21 and 22 there is a groove 37 cast in the extension 13 which forms a channel that communicates, at its inner end, with a trough 38 integral with the part 12 of the casing and, at its outer end, with the space between the sets of rollers. The groove 37 slopes slightly downwardly from left to right (Figure 1) so that lubricant will flow along it. There is also a return lubricant channel 39 in the extension 13, the inlet 40 of which is at a height such that a certain level of lubricant will always be maintained in the space between the sets of rollers when the vehicle is level.

In operation the casing is filled with lubricant to the level shown in Figure 1; and the ring gear 11 rotates anti-clockwise as shown by the arrow. The rubbing contact between the thrust pad 31 and the ring gear 11 causes lubricant to be wiped off the latter. The concave lower surface 41 of the pad 31 directs the lubricant into the trough 38 whence it flows along the groove 37 into the space between the sets 21 and 22 of roller bearings. The taper of the set 21 is such that lubricant is forced inwardly back into the casing from the space between the two sets, while the taper of set 22 is such that lubricant is forced outwardly against the baffle disc 28. The disc deflects the lubricant against the inner surface of the casing extension 13, whence it flows through the return channel 39 back into the casing 12. The quantity of lubricant flowing along the groove 37 depends partly on the shape of the trough 38, which can, therefore, be designed so that the pinion shaft bearing has adequate but not excessive lubrication throughout the engine speed range.

Thus the pinion shaft bearing is adequately lubricated by means of the very simple lubrication arrangement just decribed which adds almost nothing to the cost of the assembly, the thrust pad 31 being present in conventional assemblies, and the groove 37 and trough 38 being formed when the part 12 of the casing is cast. Furthermore, the return lubricant channel 39, by ensuring a good circulation of lubricant through the pinion shaft bearing, assists in preventing it overheating.

I claim:

1. A motor vehicle differential bevel gear assembly comprising a casing adapted to form a lubricant reservoir; a bevel ring gear housed therein; a drive pinion meshing with said ring gear, said ring gear and pinion constituting a hypoid gear set and having substantially horizontal axes, and said pinion shaft being supported in a bearing formed by two sets of tapered rollers located in an extension cast integrally with said casing; a thrust pad for said ring gear mounted in said casing adjacent said extension, said ring gear being adapted to rotate when the vehicle is travelling forwardly in a direction such that lubricant carried thereby is wiped off it by said thrust pad as the lubricant is moving upwardly, and said thrust pad having a surface which engages a hub on said ring gear, a concave lower surface on said thrust pad to direct lubricant wiped off said ring gear; a trough cast integrally with said casing and located below said thrust pad so that lubricant wiped off said ring gear is directed thereinto by said concave lower surface of said thrust pad; said casing extension having a channel communicating with said trough and a space between said sets of rollers and being such that lubricant from said trough will flow into said space to lubricate said rollers, and a second lower channel along which lubricant from said bearing will flow back into said casing, the height of said return channel inlet being such as to maintain a certain lubricant level in said space between said sets of rollers.

2. A motor vehicle differential bevel gear assembly comprising a casing adapted to form a lubricant reservoir, said casing being formed in two parts, said one part being cast and having an integral extension and said second part being a light metal closure secured to said first part and having a lubricant filler opening; a bevel ring gear housed in said casing and being connectible to a pair of wheels of said vehicle; a pinion meshing with said ring gear and being connectible to the drive shaft of said vehicle, said ring gear and pinion constituting a hypoid gear set and having substantially horizontal axes; a bearing constituted by two sets of tapered roller bearings located in said extension of said casing for supporting the shaft of said pinion; a thrust pad for said ring gear mounted on said first part of said casing adjacent said extension, one surface of said pad abutting against a hub on said ring gear, said thrust pad having a concave lower surface to direct lubricant wiped off said ring gear by said pad; said first part of said casing having a trough cast integrally therewith and located beneath said pad, a first channel in said casing extension communicating with a space between said sets of rollers and with said trough, said first channel being adapted to deliver lubricant wiped off said ring gear by said thrust pad to said bearing, and a second channel adapted to return lubricant from said bearing to said reservoir, the inlet of said second channel being such as to maintain a predetermined lubricant level in said bearing; the taper of the set of rollers adjacent the ring gear being such as to force lubricant back into the reservoir and the taper of the second set of said rollers being such as to force lubricant outwardly of said extension; a baffle disc disposed on the remote side of said second set of rollers to said ring gear to deflect lubricant forced outwardly by said second set of rollers; and a lubricant seal on the side of said disc remote from said ring gear between said extension and said pinion shaft to prevent escape of lubricant from said assembly.

3. A bevel gear assembly comprising a cast casing adapted to form a lubricant reservoir, a bevel ring gear housed in said casing and having a portion thereof within the lubricant in said lubricant reservoir, a pinion meshing with said ring gear, said pinion being mounted on a shaft, a bearing for said shaft housed in an extension cast integrally with said casing, a thrust pad for said ring gear and mounted in said casing adjacent said extension and opposite said pinion, said thrust pad having a concave lower surface having an edge abutting said ring gear to wipe lubricant off said ring gear as said ring gear is rotated past said thrust pad, said casing having an integral trough situated beneath said thrust pad to receive said lubricant wiped off said ring gear by said concave lower surface and said extension having a groove forming a channel communicating with said trough and said bearing and being adapted to deliver a lubricant to said bearing.

4. A bevel gear assembly comprising a cast casing adapted to form a lubricant reservoir, a bevel ring gear housed in said casing, a pinion adapted to mesh with said ring gear, said pinion being mounted on a shaft, an extension cast integrally with said casing and disposed about said shaft, bearing means disposed between said extension and said shaft, a thrust pad secured in said casing and having a concave lower surface abutting said ring gear and adapted to wipe lubricant off said ring gear, said casing having an integral trough situated beneath said thrust pad to receive lubricant wiped off said ring gear by said thrust pad, and said extension having a first channel communicating with said trough and said bearing means and adapted to deliver lubricant to said bearing means, said extension having a second channel communicating with said reservoir and said bearing means and adapted to return lubricant to said reservoir from said bearing means.

5. A bevel gear assembly comprising a casing adapted to form a lubricant reservoir, a bevel ring gear housed in said casing and having a portion thereof beneath the surface of the lubricant in said reservoir, a pinion adapted to mesh with said ring gear, said ring gear and said drive pinion constituting hypoid gear set, said drive pinion being mounted on a shaft, a bearing formed by tapered roller bearings for said shaft, said bearing being housed in an integral extension over said casing extending about said shaft, and a thrust pad for said ring gear mounted in said casing adjacent said extension and opposite said pinion, said thrust pad having a concave lower surface, one edge of said lower surface abutting said ring gear and adapted to wipe lubricant off said ring gear as said ring gear is rotated past said thrust pad, and means in said casing and in said casing extension to convey the lubricant wiped off said ring gear to said bearing.

6. A bevel gear assembly comprising a casing adapted to form a lubricant reservoir, a bevel ring gear housed in said casing and having a portion thereof within the lubricant in said reservoir, a pinion adapted to mesh with said ring gear, said pinion being mounted on a shaft, a bearing for said shaft, a thrust pad for said ring gear mounted in said casing and opposite said pinion, said thrust pad having a concave lower surface, an edge of said surface abutting said ring gear and wiping lubricant off said ring gear as said ring gear is rotated past said thrust pad, first passageway means adapted to deliver lubricant wiped off said ring gear to said pinion shaft bearing, and second passageway means adapted to return lubricant from said bearing to said reservoir.

7. A bevel gear assembly comprising a casing adapted to form a lubricant reservoir, a bevel ring gear housed in said casing and extending into said reservoir, a pinion adapted to mesh with said ring gear and mounted on a shaft, a bearing for said shaft, a thrust pad for said ring gear mounted on said casing on the opposite side of said ring gear from said pinion, said thrust pad having a concave lower surface, one edge of said surface abutting said ring gear, the normal direction of rotation of said ring gear being such that lubricant on said ring gear is moving upwardly as it passes said thrust pad, first passageway means adapted to deliver lubricant wiped off said ring gear by said thrust pad and second passageway means adapted to return lubricant from said bearing to said reservoir.

References Cited in the file of this patent

UNITED STATES PATENTS

| | | |
|---|---|---|
| 2,182,889 | Carlson | Dec. 12, 1939 |
| 2,368,963 | Boden | Feb. 6, 1945 |
| 2,578,155 | Slider | Dec. 11, 1951 |
| 2,654,441 | Orr | Oct. 6, 1953 |